[54] PHENOL ETHERS CONTAINING EPOXIDE GROUPS

[75] Inventors: Charles E. Monnier, Villars-sur-Glâne; Martin Roth, Giffers, both of Switzerland

[73] Assignee: Ciba-Geigy Corporation, Ardsley, N.Y.

[21] Appl. No.: 38,575

[22] Filed: Apr. 15, 1987

[30] Foreign Application Priority Data

Apr. 22, 1986 [CH] Switzerland .......................... 1620/86

[51] Int. Cl.[4] .......................... C08G 59/32; C08G 59/24; C08G 8/36; C08G 8/28
[52] U.S. Cl. .................................. 525/490; 525/481; 525/486; 528/101; 528/102; 549/554
[58] Field of Search ................ 525/481, 486, 490; 528/101, 102; 549/554

[56] References Cited

U.S. PATENT DOCUMENTS

| | | | |
|---|---|---|---|
| 2,983,703 | 5/1961 | D'Alelio | 528/101 |
| 3,291,770 | 12/1966 | Gaylord et al. | 528/101 X |
| 3,329,737 | 7/1967 | Smith | 525/490 |
| 4,384,129 | 5/1983 | Zahir et al. | 528/101 X |
| 4,677,170 | 6/1987 | Monnier et al. | 528/101 X |

FOREIGN PATENT DOCUMENTS

| | | |
|---|---|---|
| 2630107 | 1/1977 | Fed. Rep. of Germany . |
| 6060123 | 4/1985 | Japan . |
| 828364 | 2/1960 | United Kingdom . |

OTHER PUBLICATIONS

S.A. Harrison et al., J. Org. Chem. 27, 3311–13, (1962).
S. W. Tinsley, J. Org. Chem. 24, 1197–99, (1959).

*Primary Examiner*—Earl Nielsen
*Attorney, Agent, or Firm*—Luther A. R. Hall

[57] ABSTRACT

Novel epoxidised phenol ethers of formula I

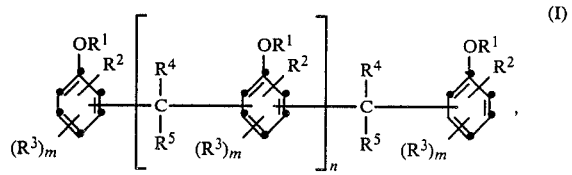

are described wherein $R^1$ denotes $C_1$–$C_{20}$alkyl, $C_5$–$C_9$cycloalkyl or $C_7$–$C_{14}$aralkyl, $R^2$ has one of the meanings of $R^1$ or is, in addition hydrogen or a radical or formula II

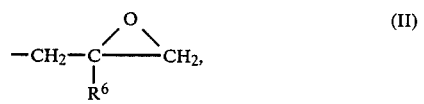

$R^3$ denotes $C_1$–$C_6$alkyl or halogen, $R^4$ and $R^5$ denotes hydrogen or $C_1$–$C_6$alkyl, $R^6$ denotes hydrogen or methyl, m is 0, 1 or 2 and n is an integer from 0 to 30, with the proviso that at least two radicals, $R^2$, must be epoxide groups of formula II. The compounds are especially suitable for encasing electronic components.

18 Claims, No Drawings

PHENOL ETHERS CONTAINING EPOXIDE GROUPS

The present invention relates to new phenol ethers containing epoxide groups, to curable mixtures containing such epoxide compounds, to the synthesis of such compounds as well as to their use for the manufacture of cured products, especially for the encapsulation of electronic components.

Glycidyl ethers based on bisphenols or on epoxidated novolaks are known. Usually such compounds are prepared by reacting the respective phenols with halohydrins, especially with epichlorohydrin.

Contingent on the manufacturing process, these products contain a certain amount of ionic halogen or hydrolyzable halogen, i.e. halogen which is not aromatically bound.

Recently, demand has increased for epoxy resins containing minimum amount of ionic or hydrolyzable halogen. Especially, in the manufacture of electronic components the synthesis via halohydrins leads to substantial amounts of these impurities which are difficult to remove from the reaction product. Therefore it would be desirable if means could be found to manufacture these epoxy resins by circumventing the halohydrins.

The epoxidation of novolak allyl ethers in a two-phase system is described in JP-OS No. 60-60,123. Hydrogen peroxide is used as oxidizing agent. The reaction is carried out in the presence of a catalytic system consisting of a quarternary ammonium salt, a vanadium, tungsten or molybdenum compound and a phosphorus compound.

It would be desirable to replace the combination hydrogen peroxide/catalyst system by the simpler epoxidation with peracids. However, this epoxidation of novolak allyl ethers with peracids leads, as own investigations have shown, to products with a low epoxy value.

GB-PS No. 828,364 discloses, inter alia, polyepoxides which are synthesized by epoxidation of the diglycidyl ether of o,o'-diallyl substituted bisphenol A with peracids. As a result of the etherification with epichlorohydrin as a reagent, the compounds have a relatively high content of non-hydrolyzable, hydrolyzable or ionic chlorine.

The present invention relates to compounds of formula I

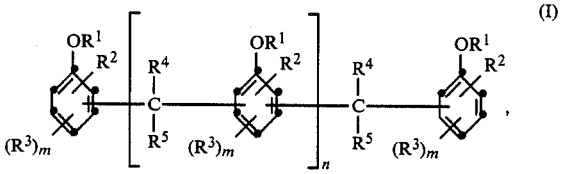

(I)

wherein $R^1$ denotes $C_1-C_{20}$alkyl, $C_5-C_9$cycloalkyl or $C_7-C_{14}$aralkyl, $R^2$ has one of the meanings of $R^1$ or is, in addition, hydrogen or a radical of formula II

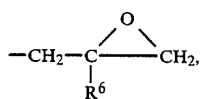

(II)

$R^3$ denotes $C_1-C_6$alkyl or halogen, $R^4$ and $R^5$, independently of one another, denote hydrogen or $C_1-C_6$alkyl, $R^6$ denotes hydrogen or methyl, m is 0, 1, or 2 and n is an integer from 0 to 30, with the proviso that at least two radicals $R^2$ in compound I must be an epoxy group of formula II.

$R^1$ as $C_1-C_{20}$alkyl is straight chain or branched, preferably however, straight chain. Examples of such radicals are methyl, ethyl, n-propyl, isopropyl, n-butyl, sec-butyl, tert-butyl, n-pentyl, hexyl, heptyl, octyl, 2-ethylhexyl, nonyl, decyl, dodecyl, tetradecyl, hexadecyl, octadecyl or eicosyl.

Preferably $R^1$ is a straight chain $C_1-C_6$alkyl group. Methyl is particularly preferred.

$R^1$ as $C_5-C_9$cycloalkyl may be, for example, cyclopentyl, cyclohexyl, cycloheptyl, cyclooctyl, or cyclononyl. Cyclohexyl is especially preferred.

Examples of $R^1$ as $C_7C_{14}$aralkyl, are: benyzl, α-methylbenzyl, α,α-dimethylbenzyl, α-ethylbenzyl or α,α-diethylbenzyl. Benzyl is preferred.

If any substituents are $C_1-C_6$alkyl they will be understood as meaning straight chain or branched alkyl radicals. However, straight chain radicals are preferred. Examples of such radicals are: methyl, ethyl, propyl, butyl, pentyl or hexyl. Methyl is especially preferred.

$R^3$ as a halogen may be fluorine, chlorine, bromine or iodine. Chlorine or bromine is preferred, with bromine being particularly preferred.

The index m determines if further substituents are present in the nucleus besides the ether group and the substituent $R^2$. Preferably m is 0. In this case there is a hydrogen atom at the phenyl nucleus in place of the substituent $R^3$.

Also falling within the scope of the invention are those novolaks in which only some of the nuclei, preferably more than 80% of the nuclei of a molecule, but at least two thereof, carry an epoxy group.

Especially preferred are compounds of formula I, as defined above, in which all radicals $R^2$ are an epoxy group of formula II.

Particularly preferred as the epoxide group of formula II is the epoxypropyl radical of formula III

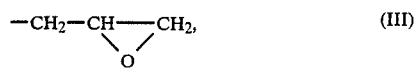

(III)

which can be obtained by epoxidation of allyl groups.

Also preferred are compounds of formula I, as defined above, wherein $R^1$ is $C_1-C_6$alkyl.

In addition, compounds of formula I are preferred, which can be derived from bisphenols. The index n is 0 in these compounds.

Also preferred are compounds of formula I, which are derived from novolak ethers, preferably from those in which n is 1 to 20, especially 3 to 20. Normally, these novolak ethers are mixtures of compounds which have varying degrees of condensation and therefore varying chain lengths.

The bridge —C($R^4R^5$)— is preferably —CH$_2$—, —CH(CH$_3$)— or —C(CH$_3$)$_2$—; thus, $R^4$ and $R^5$, independently of one another, are preferably hydrogen or methyl. In novolaks of formula I, wherein n is greater than 0, the radicals $R^2$ and —C($R^4R^5$)—, at the non-terminal positions of the phenyl nuclei are preferably in the two ortho positions and the para position to the phenolether radical —OR$^1$. Thus, the radicals $R^3$, if present, are in these cases in the meta-position(s) to the —OR$^1$ radical.

Especially preferred are compounds of formula I, as defined above, wherein R$^2$ is a radical of formula II and is in either the ortho- or para-position to the —OR$^1$ radical.

Especially preferred are compounds of formula I, in which R$^1$ is C$_1$-C$_6$alkyl or benzyl, R$^2$ is a group of formula III and is ortho to the group —OR$^1$, R$^3$ is C$_1$-C$_6$alkyl, chlorine or bromine, m is 0, 1 or 2 and n is an integer from 3 to 20.

Also preferred are compounds of formula I, wherein m is 1 or 2 and R$^3$ denotes chlorine or bromine.

The compounds of formula I can be prepared by epoxidation of phenol ethers having alkenyl substituents.

The epoxidation is usually effected by conversion of the olefinic group with peracids. This process can be carried out without using halogen-containing reagents whereby products with a low halogen content are obtained. Surprisingly, a product with a very high degree of epoxidation is obtained, whereas epoxidation of the corresponding non-etherified bisphenols or the non-etherified novolaks does not lead to epoxide formation [see S. A. Harrison et al., in *Journal of Organic Chemistry*, 27, 3311 (1962)]. The epoxidation of ethers of mononuclear o-allylphenols are described in the DE-OS 2,630,107. The yield of epoxidated product is approximately 50% of theory. The epoxidation reaction of the corresponding polynuclear allyl compounds surprisingly leads to higher yields.

The present invention therefore also relates to a process for the preparation of compounds of formula I, as defined above, starting from compounds of formula IV

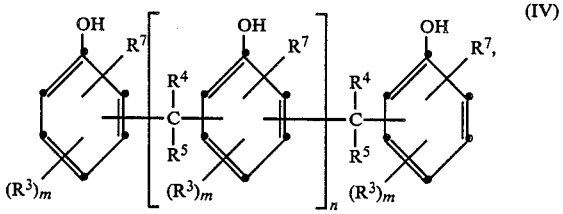

(IV)

wherein the radicals R$^3$ to R$^5$ and the indices m and n have the meanings defined above, R$^7$ has one of the meanings defined for R$^1$ above or is, in addition, hydrogen or a radical of formula V,

(V)

wherein R$^6$ has the meaning defined above with the proviso that at least two groups R$^7$ of the compounds IV must be an alkenyl group V, said process comprising the steps (a) etherification of the phenolic hydroxyl groups of compound IV with a reagent suitable for the introduction of the radical R$^1$ and (b) epoxidation of the alkenyl groups V with a reagent suitable for the introduction of the 2,3-epoxide group.

The starting materials of formula IV are well known or can be obtained by processes known per se. For example, the commercially available 2-(meth)allylphenol can be converted in a manner known per se with aldehydes to the corresponding novolaks of formula IV. In addition, the compounds of formula IV may be obtained by the Claisen rearrangement from bisphenol or novolak(meth)allyl ethers.

Especially preferred is that variant of the process in which the etherification reagent does not contain a halogen as a leaving group. For example, in such a process alkyl sulfate may be employed as etherification reagent.

All prevalent procedures may be used as methods of etherification. Thus, the polyphenol IV, for example, may be reacted with the following reagents: Alkyl halides, especially methyl chloride, methyl bromide, or methyl iodide, alkyl sulfates, especially dimethyl sulfate or alkyl sulfonates, for example, methyl-p-toluenesulfonate.

A percarboxylic acid is normally used as reagent for the epoxidation of the olefinic group of formula V. Suitable peracids for the epoxidation of the etherified compounds IV are in particular organic peracids such as performic acid, peracetic acid, persuccinic acid, perbenzoic acid, m-chloroperbenzoic acid and monoperphthalic acid. The organic peracids can be used as such or can be formed in situ, for example from aliphatic or aromatic carboxylic acids, carboxylic anhydrides, carboxylic acid esters or acid chlorides or ketene and hydrogen peroxide. For in-situ-generation of peracids it is preferred to use aliphatic or aromatic mono- or di-carboxylic acids or their anhydrides such as formic acid, acetic acid, propionic acid, succinic acid anhydride, benzoic acid, or phthalic acid and hydrogen peroxide, if necessary with the addition of acid catalysts such as sulfuric acid or alkali metal salts. The epoxidation of the adducts is preferably carried out in the presence of preformed or in situ generated performic acid or peracetic acid. If desired, inorganic peracids may also be used, such as permolybdic acid, pervanadic acid or pertungstic acid. The epoxidation agent (peracid) is conventionally used in an amount of at least 1 mole per (meth)allyl group present and preferably in excess, for example in a molar excess of 20-200%.

The etherification of compounds IV and the epoxidation of the products can be performed advantageously in the presence of inert organic solvents and in the case of the epoxidation with the addition, if necessary, of buffer compounds such as sodium acetate or sodium hydrogenphosphate. Suitable solvents are, for example, halogenated aliphatic or aromatic hydrocarbons such as chloroform, dichloromethane, benzene, toluene and chlorobenzene, ethers, such as diethyl ether, diisopropyl ether, dioxane, or tetrahydrofuran, as well as carboxylic acid alkyl esters such as ethyl acetate and -n-butyl acetate. Halogenated, especially chlorinated aliphatic hydrocarbons are preferred solvents; chloroform is particularly preferred. The reaction temperatures are usually in the range from −10° to +100° C. with the preferred range being from 10° to 60° C.

The polyepoxides which are obtained in accordance with the invention are pure substances which are substantially free of chloride and alkali metal ions. They are useful for the manufacture of cured products, for example, for encasing integrated circuits, for which utility products having a high degree of purity are required.

Accordingly, the present invention further relates to mixtures containing
(a) a polyepoxide of formula I and
(b) a hardener for component (a).

Mixtures of different polyepoxides obtainable according to the present invention and/or hardeners may be used. Suitable hardeners (b) are any epoxi resin hardeners, for example cyanamide, dicyandiamide, polycarboxylic acids, polycarboxylic acid anhydrides, polyamines, polyaminoamides, adducts of amines and polyepoxides and polyols.

Suitable polycarboxylic acids and their anhydrides are, for example, phthalic anhydride or tetrahydro- and hexahydrophthalic anhydride as well as the acids corresponding to the anhydrides mentioned above.

Polyamines, which are suitable as hardeners are, for example, aliphatic, cycloaliphatic, aromatic and heterocyclic polyamines such as hexamethylenediamine, diethylenetriamine, m-xylylenediamine, bis(4-aminocyclohexyl)methane, m- and p-phenylenediamine, bis(4-aminophenyl)methane, bis(4-aminophenyl)sulfone and aniline formaldehyde resins. Suitable polyaminoamides are, for example, those which are prepared from aliphatic polyamines and dimerized or trimerized unsaturated fatty acids.

Suitable polyol hardeners (b) are in particular mono- or polynuclear aromatic polyols, including novolaks such as resorcinol, hydroquinone, 2,6-dihydroxytoluene, pyrogallol, 1,1,3-tris(hydroxyphenyl)propane, bis(4-hydroxyphenyl)methane, 2,2-bis(4-hydroxyphenyl)propane, bis(4-hydroxyphenyl)sulfone and 4,4'-dihydroxybiphenyl as well as novolaks obtained from formaldehyde or acetaldehyde and phenol, chlorophenol or alkylphenols containing up to 8 C-atoms in the alkyl moiety, especially cresol and phenol novolaks.

Preferred hardeners are polycarboxylic anhydrides such as tetrahydrophthalic and hexahydrophthalic acid anhydride as well as aromatic polyamines, especially bis(4-aminophenyl)methane, bis(4-aminophenyl)sulfone and m- or p-phenylenediamine and most preferably polyol hardeners on the basis of novolaks, especially cresol novolaks or phenol novolaks.

The mixtures relating to the invention may also contain further customary additives, especially (c) an accelerator and/or (d) further epoxy resins.

Per se known compounds may also be used as accelerators (c). Typical examples are: complexes of amines, especially tertiary amines such as monoethyl amine with boron trifluoride or boron trichloride, tertiary amines such as benzyldimethyl amine; urea derivatives such as N-4-chlorophenyl-N'-N'-dimethyl urea (monuron); unsubstituted or substituted imidazoles such as imidazole or 2-phenylimidazole. Tertiary amines, especially benzyldimethylamine and imidazole, especially 2-phenylimidazole or 2-ethyl-4-methylimidazole are preferred accelerators (c).

Further suitable epoxide resins (d) are those carrying on average more than one group of formula II attached to a hetero atom, for example an S- or preferably an O- or N-atom as described above.

It is particulary preferred to employ as component (d) diglycidyl ethers or advanced diglycidyl ethers of divalent phenols or cyclohexanols, especially 2,2-bis(4-hydroxyphenyl)propane, 2,2-bis(dibromo-4-hydroxyphenyl)propane, bis(4-hydroxyphenyl)methane, bis(4-hydroxycyclohexyl)methane or 2,2-bis(4-hydroxycyclohexyl)propane, or polyglycidyl ethers of novolaks or tetraglycidylized 4,4'-diaminophenyl methane. Most preferred are diglycidyl ethers or advanced diglycidyl ethers of bisphenol A, of tetrabromo-bisphenol A or of bisphenol F, polyglycidylethers of phenol-formaldehyde or cresol-formaldehyde novolaks or mixtures thereof.

Components (b) and (c) are employed in the usual effective amounts, i.e., in amounts sufficient to harden the mixtures according to the invention. The ratio of components (a), (b), (c) and, optionally, (d) depends on the types of compounds used, the time necessary for the compounds to harden as well as on the desired properties of the end product and can be easily determined by the expert in the field of epoxide resin curing. Normally, if the hardener (b) is an amine, 0.75 to 1.25 equivalents of aminohydrogen are used per 1 epoxide equivalent. In the case of polycarboxylic acid or polycarboxylic acid anhydride hardeners, 0.4 to 1.1 equivalents of carboxy- or anhydride groups are used per 1 epoxide equivalent. If polyphenols are used as hardeners, 0.75 to 1.25 phenolic hydroxyl groups are used per epoxide equivalent. Accelerators are usually used in concentrations ranging from 0.1 to 0.5 weight percent with reference to the epoxide resin (a) and, if present, (d).

If desired, the viscosity of the hardenable mixtures may be lowered by adding reactive diluents such as styrene oxide, butylglycidyl ether, 2,2,4-trimethylpentylglycidyl ether, phenylglycidyl ether, cresylglycidyl ether or glycidyl esters of synthetic, highly branched and mainly tertiary aliphatic monocarboxylic acids. As further conventional additives, the mixtures according to the invention may contain plasticizers, extenders, fillers and reinforcing agents such as coal tar, bitumen, textile fibres, glass fibres, asbestos fibres, boron fibres, carbon fibres, mineral silicates, mica, quarz powder, aluminium oxide hydrate, betonite, kaolin, silica aerogel, or metal powders, for example, aluminum powder or iron powder and furthermore pigments and dyes such as carbon black, oxide colours and titanium dioxide, flame retardents, thixotropic agents, flow control agents such as silicone, waxes and stearates which are used, in part, as mould release agents and contain adhesion promoters, antioxidants and light stabilizers.

The mixtures according to the invention are used, for example, as adhesives or in the manufacture of cured products such as composites and laminates, especially however, in the encasing of electronic components. Their formulation may be adapted to their specific utility and they are used in either an unfilled or filled state, for example as paints, coating compositions, lacquers, molding materials, dip resins, casting resins, impregnating resins, laminating resins, matrix resins or adhesives.

The curing of the mixtures according to the invention may be effected in a manner know per se in either a single step or two-step process. Curing of the mixtures of the invention is usually effected by heating to temperatures in the range from 80° to 200° C., preferably from 100° to 180° C.

The cured products fabricated with the polyepoxides according to the invention are distinguished by good mechanical, thermal and chemical properties.

The invention will be illustrated in more detail by the following examples.

EXAMPLE 1

Preparation of a 2-glycidyl-novolak-methyl ether

1(a) Preparation of a 2-allylphenol-novolak

In a reaction vessel, fitted with a stirrer, reflux condenser and nitrogen inlet, a mixture consisting of 1369.2. g (10 moles) of 2-allylphenol (98% purity), 771.4 g (9 moles) of a 35% solution of formaldehyde and 23.4 g (0.26 moles) of anhydrous oxalic acid are refluxed for 15 hours. A further 42.9 g (0.5 moles) formaldehyde solution and 9.0 g (0.1 mole) oxalic acid are added and the batch is refluxed again for 15 hours. The still hot reaction product is washed with two 2000 ml portions of hot water and the residual resin (fluid if warm) freed from its volatile components by vacuum distillation. Water is distilled off first in a water jet vacuum and then in an oil pump vacuum, the bath temperature is raised to about 170° C. at which point a yellowish distillate distills over (primarily allylphenol). The residue is the yellowish allylphenol-novolak resin, which is highly viscous at room temperature. Yield=1310 g. GPC-analysis (standardization with polystyrene standards): $\overline{M}_n=991$, $\overline{M}_w=1468$.

1(b) Preparation of the 2-allylphenol-novolak-methylether 2-allylphenolnovolak (584 g, 4.0 moles) is dissolved in 2.05 l toluene and heated to 40° C. in a 6 l sulfuration flask fitted with a stirrer, condenser and thermometer. Subsequently 1600 g (20 moles) of a 50% sodium hydroxide solution are added as well as 270.75 g (10 mole %) tetrabutyl ammonium hydrogensulfate. Over 2 hours 1363.16 g (9.6 moles) of methyliodide are added dropwise at 60° C. The reaction mixture is allowed to react for a further 16 hours, cooled and washed with 5 l of water and a 10% solution of sodium hydrogensulfate, dried and concentrated under vacuum, affording 633.50 g 2-allylnovolakmethyl ether (98.85% of the theoretical yield) having a viscosity of 8100 mPas (40° C.) and <110 ppm total chlorine.

1(c) Epoxidation of 2-allylphenolnovolakmethylether 2-allylphenolnovolakmethylether (250 g, 1.56 moles) is charged to a 1.5 l sulfuration flask fitted with a stirrer, thermometer and condenser and then dissolved in 750 ml toluene. To this solution are added 26.5 g sodium acetate and subsequently 295 g (1.87 moles) of 40% peracetic acid are added dropwise over 3 hours. The reaction temperature is maintained at 40°–45° C. The reaction is then allowed to go to completion over 6 hours and then the reaction mixture is diluted with 250 ml toluene. The aqueous phase is separated and the organic phase is extracted with 5×250 ml of 10% NaHCO$_3$ until the reaction mixture is neutral and free of peroxide. The solution is dried over Na$_2$SO$_4$, filtered and concentrated.

Yield: 213.4 g (78% of the theory) of a viscous resin (700 mPas at 120° C.) having an epoxy value of 4.02 equivalents/kg and <118 ppm total chlorine.

EXAMPLE 2

Epoxidation of 2-allylphenolnovolakmethyl ether 215.9 g (0.70 moles) of a 2-allylphenolnovolak methyl ether ($\overline{M}_n=321$; $\overline{M}_w=340$; GPC-analytically determined) and synthesized in analogy to Examples 1(a) and 1(b) is added to a sulfuration flask fitted with a stirrer, thermometer and condenser and then dissolved in 630 ml chloroform. To this solution are added 11.7 g of sodium acetate and the 309.0 g (1.63 moles) of 40% peracetic acid are added dropwise over 4 hours. The reaction temperature is maintained at approximately 35° C. The reaction is allowed to go to completion over 4 hours and the reaction mixture is then taken up in 1 l chloroform. The aqueous phase is separated, the organic phase is washed with a 2% sodium hydroxide solution until neutral and then dried over Na$_2$SO$_4$ and Na$_2$SO$_3$, i.e. made peroxide free, filtered and concentrated.

Yield: 220.7 g (92.5% of the theoretical yield) of a viscous resin having an epoxy value of 4.43 equivalents/kg.

EXAMPLE 3

Epoxidation of 2-allylphenolnovolak methyl ether

Following the procedure of Example 2, 48.1 g (0.3 moles) of a 2-allyl-phenolnovolak methyl ether ($\overline{M}_n=309$; $\overline{M}_w=325$; GPC-analytically determined) is reacted with 68.3 g (0.36 moles) of 40% peracetic acid and 5.0 g sodium acetate in 150 ml chloroform.

An epoxidated product is obtained with an epoxy value of 4.22 equivalents/kg.

GPC-analysis (Standardization with polystyrene standards): $\overline{M}_n=311$; $\overline{M}_w=333$.

Total chlorine content: less than 100 ppm.

EXAMPLE 4

Epoxidation of a 2-allylphenolnovolak methyl ether

Following the procedure of Example 2, 48.1 g (0.3 moles) of a 2-allyl-phenolnovolak methyl ether ($\overline{M}_n=449$, $\overline{M}_w=548$; GPC analytically determined) is reacted with 68.3 g (0.36 moles) of 40% peracetic acid and 5.0 g sodium acetate in 150 ml chloroform.

Yield: 46.61 g (88.17% of the theoretical yield) of an epoxidated product with an epoxy value of 4.45 equivalents/kg and a viscosity of 550 mPas at 80° C. as measured in an Epprecht viscometer.

GPC-analysis (Standardization with polystyrene standards): $\overline{M}_n=453$; $\overline{M}_w=578$.

Total chlorine content: less than 100 ppm.

EXAMPLE 5

Epoxidation of a 2-allylphenolnovolak methyl ether

Following the procedure of Example 2, 48.1 g (0.3 moles) of a 2-allylphenolnovolak methyl ether ($\overline{M}_n=543$; $\overline{M}_w=825$; GPC analytically determined) is reacted with 68.3 g (0.36 moles) of 40% peracetic acid and 5.0 g sodium acetate in 150 ml chloroform.

Yield: 52.0 g (98.3% of the theory) of an epoxidated product with an epoxy value of 4.25 equivalents/kg and a viscosity of 3270 mPas at 80° C. as measured in an Epprecht viscometer.

GPC-analysis (Standardization with polystyrene standards): $\overline{M}_n=543$; $\overline{M}_w=877$.

EXAMPLE 6

Epoxidation of a 2-allylphenolnovolak methyl ether

Following the procedure of Example 2, 48.1 g (0.3 moles) of a 2-allylphenolnovolak methyl ether ($\overline{M}_n=742$; $\overline{M}_w=1397$; GPC analytically determined) is reacted with 68.3 g (0.36 moles) of 40% peracetic acid and 5.0 g sodium acetate in 150 ml chloroform, to give an epoxidated product with an epoxy value of 4.21 equivalents/kg.

GPC-analysis (Standardization with polystyrene standards): $\overline{M}_n=711$; $\overline{M}_w=1429$.

Total chlorine content: less than 100 ppm.

EXAMPLE 7

Preparation of 2,2'-bis-(3[2,3-epoxypropyl]-4-methoxyphenyl)propane 336.5 g (1.0 mole) of 2,2'-bis(3-allyl-4-methoxyphenyl)-propane are dissolved in 1000 ml of chloroform. With stirring, 49.4 g (0.6 moles) of sodium acetate are added. Then, 418.1 g (2.2 moles) of 40% peracetic acid are added dropwise over 3 hours at 20°–40° C. Subsequently, the reaction is allowed to continue for 9 hours and then the reaction mixture is diluted with 1000 ml chloroform and the phases are separated. The organic phase is washed twice with 500 ml aliquots of deionized water and then neutralized with two 500 ml aliquotes of 10% aequous NaHCO3 solution. Thereafter the organic phase is dried over Na2SO4 and Na2SO3 and freed from peroxides (checked with iodide starch paper). After filtration the solvent is stripped in a rotary evaporator at 39.9 mPa and 70° C. Subsequently the product is dried at 0.11 mPa and 80° C., to give 361.25 g of a viscous resin. (Yield: 98% of theory).

The product has an epoxy value of 4.314 equivalents/kg, a viscosity of 2260 cP at 40° C. and an average molecular weight of $\overline{M}_n = 337$; $\overline{M}_w = 358$ (GPC-analytically determined).

EXAMPLE 8

Preparation of a 2,3-epoxypropyl-bisphenol-F-methylether

Following the procedure of Example 7, 308.4 g (1.0 mole) of a diallyl-dimethoxy-bisphenol F are reacted with 49.4 g (0.6 moles) sodium acetate and 418.1 g (2.2 moles) peracetic acid in 1000 ml chloroform. Working up, as described in Example 7, affords 294.85 g (86.6% of theory) of a viscous resin having an epoxy value of 4.840 equivalents/kg and a viscosity of 7470 cP at 40° C. and an average molecular weight of $\overline{M}_n = 400$; $\overline{M}_w = 569$ (GPC-analytically determined).

The starting diallyl-dimethoxy-bisphenol F is prepared in the following manner:

4.0 moles of bisphenol F (content of binuclear, trinuclear or polynuclear compounds is 76.5, 14.4 and 9.1% by weight respectively; Strucural isomerism of the binuclear compounds: 13.0% by weight o,o'-derivative, 49.1% by weight o,p'-derivative and 37.9% by weight p,p'derivative) are heated together with 5 l of toluene together with 10 moles of tetrabutyl ammonium sulfate to 80° C. Then 1600 g (20 moles) of 50% aqueous sodium hydroxide are added dropwise. Subsequently, 13.6 moles allylchloride are added dropwise and the reaction is allowed to continue for one hour under reflux conditions. The reaction mixture is then shaken with four 2 l aliquots of 10% HCl solution and subsequently washed with two 2 l aliquots of deionized water. The organic phase is separated and concentrated in a rotoray evaporator affording 1122 g of product (yield: 100% of theory). The product has a molecular weight of $\overline{M}_n = 323$; $\overline{M}_w = 333$ determined by GPC analysis and takes up 8.6 milli moles of hydrogen per g on hydrogenation in DMA (catalyst: Pd on charcoal, 5% by weight).

1108 g of the diallyl ether of bisphenol F prepared in the step above are added to 16.2 g LiCl, 4.25 g Na2CO3 in 260 ml toluene. The mixture is heated to 150° C. whereupon the toluene distills off. Subsequently, the temperature is slowly raised to 190° C. and maintained for 3 hours. Then the temperature is raised by another 10° C. and maintained at this level for another 2 hours. After cooling to 80° C. the reaction mixture is washed with water and the product is taken up in toluene. After separation of the toluene the diallyl substituted Bisphenol F is obtained.

350 g (1.25 moles) of the above prepared diallyl-bisphenol F are added to 42.5 g (0.1 mole) tetrabutyl ammonium hydrogen sulfate in 625 ml toluene. The mixture is heated to 80° C. and 500 g (6.25 moles) of 50% aqueous sodium hydroxide are added over 2 hours (violet discoloration). The reaction mixture is then cooled to 70° C. and 425.75 g (3 moles)methyliodide are added over 2 hours. The reaction mixture is allowed to stand overnight at 80° C. and is then shaken once with 500 ml of water. The organic phase is separated and neutralized with a 2% hydrochloric acid solution and washed once again with water. After separation of the organic phase the product is dried over Na2SO4, filtered and solvent is stripped off in a rotary evaporator affording 353.4 g of a dimethyl ether of the diallyl-bisphenol F (Yield: 91.7% of theory). The product has a viscosity of 510 cP at 25° C. and a molecular weight of $\overline{M}_n = 405$; $\overline{M}_w = 594$ determined by GPC analysis. An OH-band is no longer detectable in the IR spectrum. Instead a CH3-O-absorption is observed at 3.8 ppm in the 1H-NMr spectrum (measured against TMS in CDCl3 singlet).

APPLICATION EXAMPLES

Examples A–D (general working instructions)

100 parts by weight of the respective epoxidated product are mixed with the amounts indicated in the following table of an o-cresol-novolak hardener (8.3 OH-equivalents/kg) and 2-ethyl-4-methylimidazole (EMI) as a hardening accelerator. The glass transition temperatures of the mixtures are measured with the use of a differential thermal analyser (measuring range: 25°–250° C.; heating rate: 5° C./min).

Furthermore, the $T_g$ values of the previously hardened mixtures are determined ($T_g$-screen values). The results are also represented in the following table:

| Example | A | B | C | D |
| --- | --- | --- | --- | --- |
| Epoxide according to Example (parts by weight) | Ex. 3 (100) | Ex. 4 (100) | Ex. 5 (100) | Ex. 6 (100) |
| Parts by weight of hardener | 53.4 | 53.6 | 51.2 | 50.7 |
| Parts by weight of EMI | 0.25 | 0.49 | 0.47 | 0.46 |
| $T_g$ (°C.) | 99 | 108 | 121 | 131 |
| $T_g$ Screen (°C.) | 96 | 106 | 119 | 138 |

We claim:

1. A compound of formula I

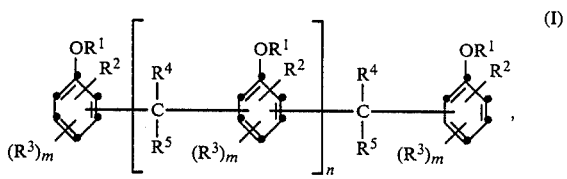

wherein R1 denotes C1–C20alkyl, C5–C9cycloalkyl or C7–C14aralkyl, R2 has one of the meanings of R1 or is, in addition, hydrogen or a radical of formula II $$-CH_2-\underset{R^6}{C}\overset{O}{\underset{}{\diagdown\diagup}}CH_2, \qquad (II)$$

$R^3$ denotes $C_1$–$C_6$alkyl or halogen, $R^4$ and $R^5$ independently of one another denote hydrogen or $C_1$–$C_6$alkyl, $R^6$ denotes hydrogen or methyl, m is 0, 1 or 2 and n is an integer from 0 to 30, with the proviso that at least two radicals $R^2$ in compound 1 must be an epoxy group of formula II.

2. A compound of formula I as claimed in claim 1, wherein all radicals $R^2$ denote a group of formula II.

3. A compound of formula I as claimed in claim 2, wherein the epoxide group $R^2$ is an epoxypropyl radical of formula III $$-CH_2-CH\underset{O}{\diagdown\diagup}CH_2, \qquad (III)$$

4. A compound of formula I as claimed in claim 1, wherein $R^1$ denotes $C_1$–$C_6$alkyl.

5. A compound of formula I as claimed in claim 4, wherein $R^1$ denotes methyl.

6. A compound of formula I as claimed in claim 1, wherein n is 0.

7. A compound of formula I as claimed in claim 1, wherein n is an integer from 1 to 20.

8. A compound of formula I as claimed in claim 1, wherein $R^4$ and $R^5$, independently of one another are hydrogen or methyl.

9. A compound of formula I as claimed in claim 1, wherein $R^2$ is a radical of formula II and is either in the ortho- or in the para-position to the —$OR^1$ radical.

10. A compound of formula I as claimed in claim 1, wherein n is greater than 0 and the groups —$C(R^4R^5)$— and $R^2$ at the non-terminal phenyl nuclei are each in the two ortho-positions and in the para-position with respect to the radical —O—$R^1$.

11. A compound of formula I as claimed in claim 1, wherein $R^1$ is $C_1$–$C_6$alkyl or benzyl, $R^2$ denotes a group of formula III as defined in claim 3 and is in the ortho-position to the group —O—$R^1$, $R^3$ is $C_1$–$C_4$alkyl, chlorine or bromine, m denotes 0, 1 or 2 and n is an integer from 3 to 20.

12. A compound of formula I as claimed in claim 1, wherein m is 1 or 2 and $R^3$ denotes chlorine or bromine.

13. A mixture containing (a) a polyepoxide of formula I as claimed in claim 1 and (b) a hardener for component (a).

14. A mixture as claimed in claim 13 which contains as additional component (c) an accelerator or (d) further epoxy resins or mixtures of (c) and (d).

15. A process for the preparation of compounds of formula I as claimed in claim 1 starting from compounds of formula IV wherein the radicals $R^3$ to $R^5$ and the indices m and n are as defined in claim 1, $R^7$ has one of the meanings of $R^1$ as claimed in claim 1 or, in addition, is hydrogen or a radical of formula V $$-CH_2-\underset{R^6}{C}=CH_2, \qquad (V)$$

wherein $R^6$ is as defined in claim 1, with the proviso that at least two groups $R^7$ of compounds IV must be an alkenyl group V, said process comprising the steps
(a) etherification of the phenolic hydroxyl groups of compound IV with a reagent suitable for introduction of the radical $R^1$ and
(b) epoxidation of the alkenyl groups V with a reagent suitable for introduction of the 2,3-epoxide group.

16. A process for the preparation of compounds of formula I as claimed in claim 15, wherein the etherification reagent does not contain a halogen as a leaving group.

17. A process for the preparation of compounds of formula I as claimed in claim 15, wherein the epoxidation reagent is a percarboxylic acid.

18. An electronic component encapsulated in the cured composition of claim 13.

* * * * *